March 13, 1956  O. D. DILLMAN ET AL  2,737,791
PRESSURE LUBRICATED UNIVERSAL JOINT
Filed Aug. 30, 1951  2 Sheets-Sheet 1

INVENTORS.
Seth T. Foresman.
Oscar D. Dillman.
BY
Harness and Harris
ATTORNEYS.

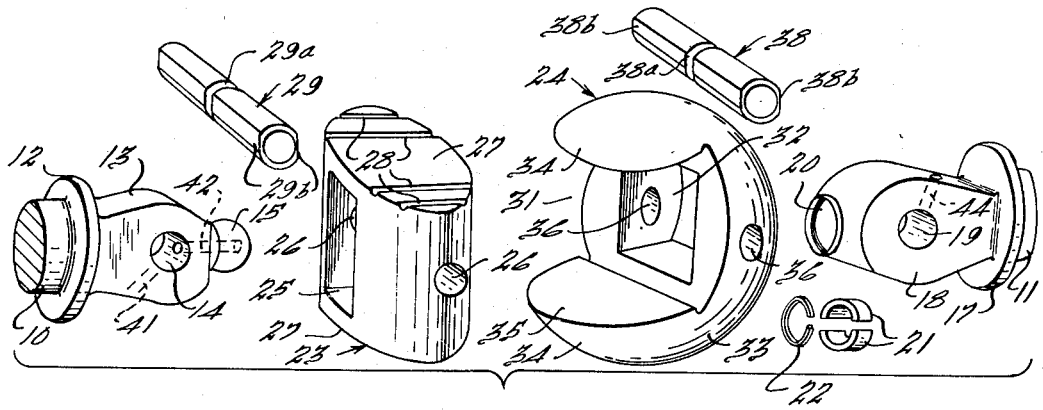
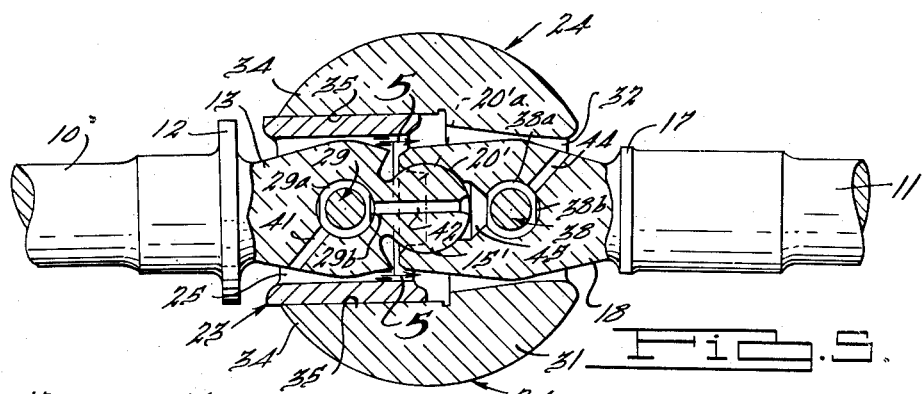
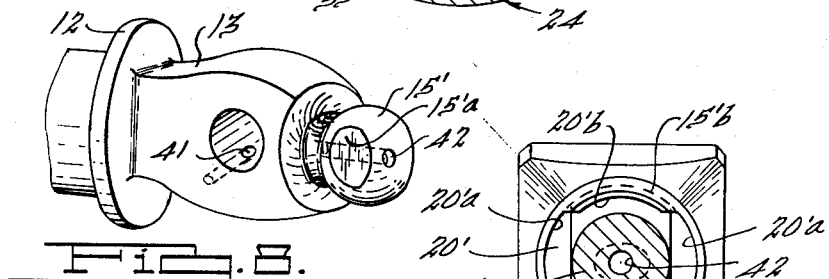
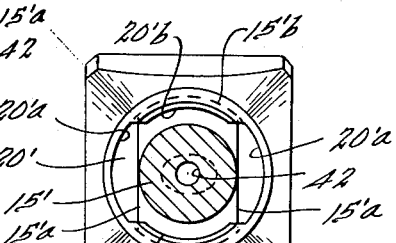

United States Patent Office 2,737,791
Patented Mar. 13, 1956

2,737,791

PRESSURE LUBRICATED UNIVERSAL JOINT

Oscar D. Dillman, Huntington Woods Manor, and Seth T. Foresman, Royal Oak, Mich., assignors to Chrysler Corporation, Highland Park, Mich., a corporation of Delaware Application August 30, 1951, Serial No. 244,314

4 Claims. (Cl. 64—21)

This invention relates to universal joints of the type adapted to transmit rotary motion between a driving and driven shaft in such a manner that the rate of angular velocity of the shafts shall be constant for all angular relationships of the shafts. In particular this invention relates to novel means for insuring pressurized lubrication of the several engaged, relatively movable portions of such a universal joint.

It is a primary object of this invention to provide a pressurized lubrication system for a constant velocity type of universal joint wherein the oscillation of certain members of the joint during rotation of the joint provides working plungers to force lubricant to the several relatively movable portions of the joint.

It is an additional object of this invention to provide a pressurized lubrication system for the interengaged thrust transmitting ball and socket connection of a constant velocity type of universal joint.

It is another object of this invention to provide a constant velocity universal joint having a ball and socket connection between the adjacent shaft ends wherein the ball and socket members are interconnected by novel means that provide a thrust center to take and directly transmit both tensile and compressive forces between the joint-connected shafts.

It is another object of this invention to provide a pressurized lubrication system for the slidably engaged, torque transmitting surfaces of a block and jaw type constant velocity universal joint construction.

It is also an object of this invention to provide a shaft generated pressurized lubrication system for the pivot pins, thrust transmitting and torque transmitting surfaces of a universal joint.

It is another object of this invention to provide a universal joint that is simple and durable in construction, easily manufactured at a reasonable cost, easily assembled and disassembled, highly efficient in operation, one that lends itself to a compact installation due to the reduced external bearing requirements, and one wherein the elements provide a novel form of pressurized lubrication system for the relatively movable members of the joint.

Other objects and advantages of this invention will become apparent from a reading of the subsequent description and a consideration of the related drawings wherein:

Fig. 4 is an exploded perspective view of the force transmitting elements of the universal joint shown in Fig. 1.

Fig. 5 is a sectional elevational view of a similar form of universal joint that utilizes a modified form of ball and socket shaft end connection;

Fig. 6 is an enlarged sectional elevational view of the modified form of ball and socket end connection, the view being taken along the line 6—6 of Fig. 5;

Fig. 7 is a perspective view of the socket formation on the end of one of the shafts in the Fig. 5 construction; and Fig. 8 is a perspective view of the terminal portion of the shaft carrying the ball-like end formation of the Fig. 5 modified form of the invention.

Figures 1, 2, 3:
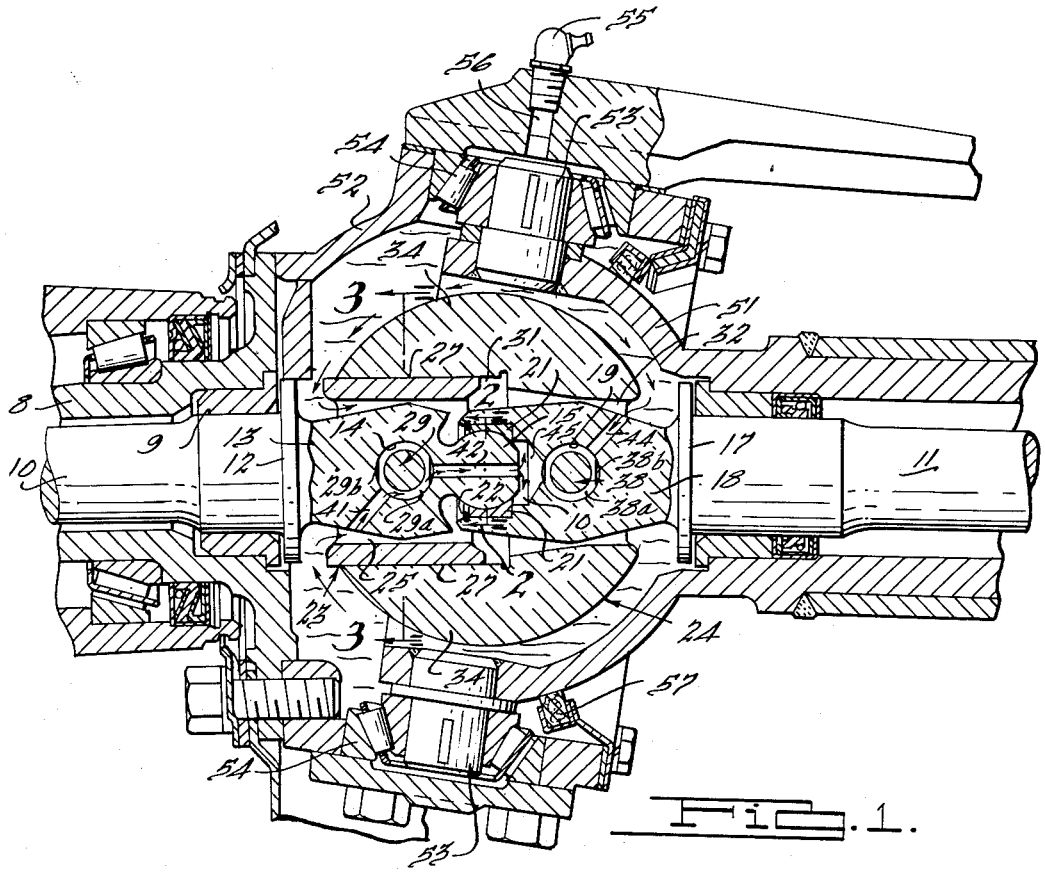
Fig. 1 is a sectional elevational view of one form of the universal joint embodying this invention applied to a motor vehicle drive transmitting mechanism.
Fig. 2 is an enlarged, fragmentary, sectional elevational view of the ball and socket joint connection, the view being taken along the line 2—2 of Fig. 1.
Fig. 3 is a sectional elevational view of one of the pivot pin connections in the universal joint, the view being taken along the line 3—3 of Fig. 1.

This invention relates to and is an improvement on the constant velocity universal joint disclosed in the patent application of John P. Butterfield, Serial No. 62,319, filed November 27, 1948, now U. S. Patent 2,609,673. In Fig. 1 the universal joint is shown applied between two power transmitting shafts 10 and 11 respectively, one of which shafts 10 may be considered the driving member and the other shaft 11 the driven member. The shaft 10 is mounted in a housing 8 by means of a sleeve-like thrust bearing 9. Shaft 10 is provided with an encircling thrust shoulder 12 and a flat-sided, axially extending, terminal portion 13 which is pierced by a transversely extending bore 14. Bore 14 has an axis that is at right angles to and intersects the axis of shaft 10. The flat sides of terminal portion 13 provide bearing surfaces that may be engaged by cooperating surfaces on the associated torque transmitting member 23. Projecting from the exposed end of shaft terminal portion 13 is a substantially spherical or ball-shaped formation 15 that is aligned with the axis of the shaft 10.

Shaft 11 is also provided with an encircling thrust shoulder 17 and a flat-sided, axially extending, terminal portion 18 which is pierced by a transversely extending bore 19 having its axis intersecting and at right angles to the axis of shaft 11. The flat sides of terminal portion 18 provide bearing surfaces that may be engaged by cooperating surfaces on the torque transmitting member 24 associated therewith. Formed in the exposed end of the driven shaft terminal portion 18 and aligned with the axis of shaft 11 is a cylindrical recess 20. Recess 20 in the end of shaft 11 is larger in diameter than the spherically-shaped projection 15 carried by shaft 10 so that projection 15 may be seated within the recess 20 when the joint elements are assembled. A pair of semi-cylindrical, sleeve-like, collars or bushings 21 are arranged to encircle the ball-like projection 15 on shaft 10 when projection 15 is mounted in the socket 20 of shaft 11. A C-shaped split ring 22 is arranged to be sprung into a mating groove in the wall of shaft bore 20 to anchor the ball 15 and bushings 21 in the bore 20 so that both tensile and compressive forces may be directly transmitted between the interengaged shaft ends.

In addition to the cooperating terminal formations on the shafts 10 and 11 this universal joint includes the male and female torque transmitting coupling elements 23 and 24 respectively. Male coupling element 23 is a block of elliptically-shaped cross sectional configuration having parallel, flat-sided end faces 27 and a rectangularly-shaped, longitudinally extending opening 25 piercing the block in the direction of its minor axis. Opening 25 is adapted to receive the flat-sided terminal portion 13 of shaft 10. Coupling element 23 is also pierced by a transversely extending bore 26 which extends in the direction of the major axis of the elliptically-shaped block member 23. Bore 26 is adapted to be aligned with the bore 14 in the terminal portion 13 of shaft 10, when the latter shaft portion is mounted within block opening 25. A pin 29 is mounted in the aligned bores 14 and 26 to pivotally connect the shaft 10 to the coupling member 23 and provide means for the transmission of torque between these connected elements. The flat-sided ends 27 of coupling member 23 are preferably formed with lubricant retaining grooves 28 for a reason that will hereinafter be fully explained.

Female coupling member 24 is substantially a spherically-shaped solid having a U-shaped, transversely extending, cut-out portion 31 extending therethrough in one direction and a rectangularly-shaped, longitudinally extending, opening 32 extending therethrough at right angles to and intersecting the U-shaped opening 31. The U-shaped cut-out portion 31 causes coupling element 24 to resemble a yoke or jaw member and divides the coupling member 24 into a base portion 33 and a pair of spaced apart tongue members 34. Each tongue member 34 has a flat inner side 35. The opposed inner flat sides 35 of tongues 34 are parallel and spaced apart a distance slightly greater than the distance between the ends 27 of male coupling member 23 which latter member is adapted to be slidably mounted within the cut-out portion 31 of member 24. The rectangular opening 32 in the base portion 33 of coupling member 24 is adapted to receive the terminal portion 18 of shaft 11. Base portion 33 of member 24 is pierced by a transversely extending bore 36 which is adapted to be aligned with the bore 19 in the terminal portion 18 of shaft 11 when the latter shaft portion is mounted in opening 32. A pin 38 is mounted in aligned bores 19 and 36 to pivotally connect the shaft 11 to the coupling member 24 and provide for the transmission of torque therebetween.

In the arrangement shown it will be noted that the axes of the pins 29 and 38 are equally spaced from the point of intersection of the shaft axes. Also it will be noted that the coupling members 23 and 24 are pivotally connected to their supporting shaft members 10 and 11 on pivot axes extending at right angles to and intersecting the axis of the supporting shafts. Furthermore, the coupling members 23, 24 are each provided with oppositely disposed parallel bearing surfaces 27 and 35 respectively which slidably engage the mating parallel bearing surfaces on the other coupling member, and these surfaces are slidable relative to one another in any direction parallel to the surfaces 27 and 35. In addition the pivot axes for the coupling members are always in a plane parallel with the planes of the mating bearing surfaces. Also it will be noted that the ball and socket connection 15, 20 between the shafts maintains the shafts aligned to assure constant velocity torque transmission.

With the shafts 10 and 11 pivotally connected to their respective coupling members 23 and 24 by the pins 29, 38 and the ball 15 on shaft 10 mounted in its mating socket 20 in the end of shaft 11 a constant velocity universal joint is provided which directly transmits thrust and radial loads between the connected shafts regardless of the angularity of the shafts 10, 11. During rotation of the shafts 10 and 11 the coupling members 23 and 24 rock or oscillate back and forth about their respective pivot pin axes 29 and 38 and at the same time the end faces 27 of male coupling member 23 slide across the mating inner side faces 35 of the tongues 34 of female coupling member 24. The lubricant supplied to the retaining grooves 28 in the end faces 27 of male coupling member 23 is intended to keep the contacting coupling faces 27 and 35 lubricated at all times so that frictional resistance is reduced to a minimum.

It has been found that wear of the elements of a universal joint of this type can be kept to a minimum by having a continuous film of lubricant between the several, engaged, relatively movable, surfaces of the joint elements. This type of joint is of such a construction that the elements thereof, by their specific formation and arrangement, provide a pressurized lubrication system for continuously circulating lubricant throughout the joint and across all slidably or rotatably engaged surfaces thereof. Furthermore, this pressurized lubrication system does not require any special or additional parts for the joint. It is merely necessary to form a few lubricant transmitting bores and grooves or slots 41, 29a, 42 and 44, 38a, 45 in the existing elements of the joint and then the relative rocking movement of the shaft terminal portions 13, 18 in their receiving openings 25, 32 of the block and jaw elements 23, 24 respectively provides a forced feed lubrication system that continuously circulates lubricant throughout the joint in the manner indicated by the arrows in Fig. 1.

Fig. 1 shows that the driving shaft terminal portion 13 has a first bore 41 extending therethrough between the block opening 25 and the pivot pin receiving bore 14. Bore 41 in shaft terminal portion 13 intersects the pivot pin 29 at a point where the pin 29 is encircled by a groove 29a. Projecting axially of the shaft terminal portion 13 and extending between the pin groove 29a and the outer end of the ball-like formation 15 is a second bore 42. Bore 42 thus connects the pivot pin bore 14 with the socket 20. It is thought to be apparent that any lubricant forced radially inwardly through bore 41 can pass into groove 29a of pin 29 and around groove 29a into bore 42 where it can be passed on to the socket cavity 20 for the ball 15. Lubricant in socket 20 will keep the ball and socket connection continuously lubricated and the lubricant that escapes from socket 20 can pass back into jaw opening 31 for eventual recirculation through the lubricating conduits of this joint. In addition to supplying lubricant to the socket 20, the lubricant passed through bore 41 to pin groove 29a can also pass lengthwise along the pin outer surfaces due to the flat sides 29b of the pin 29 that provide a pair of diametrically disposed slots within the bore 14 of the shaft terminal portion 13. These slots along the pin 29 not only lubricate the pin 29 in bore 14 but they also provide lubricant transfer conduits for passing lubricant to the outside of the block member 23. As the open portion 31 of the jaw member 24 is enclosed by lubricating grease, it is thought to be obvious that the movement of the block member 23 within the jaws 34 continuously circulates grease across the slidably engaged torque transmitting surfaces 27, 35 of the joint so as to insure lubrication of these engaged surfaces at all times.

Fig. 1 also shows the lubricant transfer conduits in the terminal portion 18 of the driven shaft 11. A first lubricant bore 44 extends from an outer side face of shaft terminal portion 18 radially inwardly so as to intersect the pivot pin bore 19. Pivot pin 38 has an encircling groove 38a that connects with bore 44 so as to transfer lubricant around the pivot pin 38 and into each of the slots formed by the flat sides 38b of the pin 38. The flat sides 38b insure continuous lubrication of the pivot pin bore 19. A second bore 45 in shaft terminal portion 18 connects the pin groove 38a with the ball receiving socket formation 20. It is thought to be obvious that lubricating grease that can be forced into bore 44 can pass around groove 29a in pivot pin 29 and flow outwardly therefrom into the slots along the flat sides 29b of the pivot pins and also into the bore 45.

It has been found that the oscillating movement of the block and jaw portions 23, 24 about their respective pivot pins 29, 38, during rotation of the shafts 10, 11, is such that it cooperates with the adjacent surfaces of the shaft terminal portions 13, 18 to provide a pair of pump plunger devices to automatically and continuously circulate lubricating grease or the like through the aforementioned bores, grooves and slots of this universal joint so as to keep all engaged, relatively movable surfaces of this joint continuously lubricated. For instance during rotation of the shafts (see Fig. 1), as the block 23 is swung about its pivot pin 29 in a clockwise direction the lubricant in the opening indicated by the numeral 25 will be forced up bore 41 and into groove 29a, through the slots along flat pin sides 29b and into the bore 42 for deposit into the socket 20 that journals the ball 15. At the time block 23 is forcing lubricant up bore 41, the jaw member 34 is swinging counterclockwise about its pivot pin 38 so that lubricant is not being forced into bore 44 from the space designated by the numeral 32. However, after a half of a revolution of the shafts 10, 11, the relative oscillatory movement of the block 23 and jaw 34 about their respective pivot pins 29, 38 will be reversed and block 34 will then swing clockwise about its pivot pin 38 so that the space 32 will be progressively diminished and lubricant therein will be forced into the bore 44, through groove 38a and into the slots along the flat sides 38b of the pin 38 as well as into the bore 45 and into ball receiving socket 20. At the time space 32 is being diminished, space 25 is being increased so the pumping action automatically shifts from one shaft terminal portion to the other to provide a continuous pressurized lubrication system for the universal joint. It will be noted that neither of the pump plunger devices bucks or opposes the action of the other but each acts alternately to supplement the other and provide a continuous flow of lubricant to the ball and socket connection between the shafts 10, 11.

The block and jaw universal joint (see Fig. 1) is encircled by a pair of mating, semi-spherical casing members 51, 52 with casing member 51 journaled on member 52 by the trunnions 53. Trunnions 53 are supported in roller bearing assemblies 54 that have a plurality of axially directed slots extending therethrough between the several roller elements. Lubricant may be forced into the interior of casing members 51, 52 through the fitting 55 and bore 56 from whence it passes through the adjacent bearing 54 and into the casing interior. The interior of casing 51, 52 is thus completely filled with lubricant initially and thereafter the aforementioned pumping devices continuously circulate the lubricant to the relatively movable, engaged surfaces. Suitable seal means 57 is used to prevent leakage from the case members 51, 52.

Figs. 5, 6 and 7 show a constant velocity joint of the type shown in Figs. 1-4 but in the Fig. 5-7 form a modified form of connection is used to join the ball and socket elements on the shaft terminal portions 13, 18. The lubricating system in this modified form of joint is identical to that of the Fig. 1-4 form so description thereof is considered unnecessary. Identical reference numerals have been assigned to those portions of the two forms of universal joints that are identical in construction. It will be noted from Figs. 5 and 6 that the socket formation 20' in the end of shaft terminal portion 18 is substantially a spherical formation rather than a cylindrical formation as shown at 20 in Figs. 1 and 4. However, at opposite sides of the open end to the spherical socket formation 20', portions of the side walls 20'a have been cut away to provide enlarged diametrically opposed slots for a purpose that will subsequently become apparent. The ball-like formation 15' on the end of shaft terminal portion 13 has had flat sides 15'a formed thereon at diametrically opposed locations. From a consideration of Fig. 6 it is thought to be obvious that when shaft 10 is rotated 90 degrees from the position shown in Fig. 6, that then the portions 15'b of the ball-like formation 15' on terminal portion 13 will be disengaged from the lip-like formations 20'b of the socket formation 20' in the end of shaft terminal portion 18. When so rotated the ball formations 15'b will be located in the slots 20'a of the socket 20' and the ball-like formation 15' may be detached from the socket formation 20'. To assemble the ball and socket formations 15', 20' the portions 15'b and 20'a are aligned and then engaged after which one of the shafts 10 or 11 is rotated 90 degrees. After this the block and jaw elements 23, 24 are anchored to the shaft terminal portions 13, 18 by the pivot pins 29, 38 and the shafts are connected for the transmission of thrust forces as well as torque.

From the above description, it is apparent that this invention discloses a simplified form of universal joint having novel shaft interconnecting means as well as a novel form of pressurized lubrication system that is the result of the inherent movement of the elements of the joint during rotation thereof. Furthermore, the lubrication system does not require the use of additional parts but merely the location of a series of openings or bores in a particular manner to take advantage of the oscillatory movement of certain of the elements of the joint during rotation thereof.

We claim:

1. In a universal joint, a pair of shafts having intersecting end portions that are enclosed by a lubricant retaining casing and connected by a self-centering connection, a coupling member pivotally connected to each shaft end having surface portions thereof slidably engaged with mating surface portions on the coupling member mounted on the other shaft, said engaged surface portions of said coupling members providing means for the transmission of torque between said shafts, said coupling members having their pivot axes extending transversely of the shafts to which they are connected to permit the coupling members to oscillate about their shaft pivotal connections during rotation of said shafts in angularly related positions, and a lubricant transfer conduit piercing at least one of said shaft end portions and extending substantially lengthwise thereof, said lubricant conduit being connected to the self-centering connection between the shaft end portions and having an inlet port in a side surface of said one shaft at a point that is longitudinally spaced from said self centering connection and radially spaced outwardly from the associated coupling member pivot axis, said lubricant conduit inlet port being positioned adjacent to but spaced from a wall portion of the associated coupling member that oscillates towards and away from the inlet port during shaft rotation such that whenever said casing contains sufficient lubricant to provide a lubricant film over the joint exterior that covers the said inlet port the oscillatory movement of said coupling members during shaft rotation causes the said wall portion of the coupling member adjacent the said inlet port to successively move towards and away from portions of the shaft to which it is pivotally connected so as to squeeze the lubricant adjacent the outer side of the inlet port through the lubricant conduit to the self-centering shaft end interconnection.

2. In a universal joint, a pair of shafts having intersecting end portions that are enclosed by a lubricant retaining casing and connected by a self-centering ball and socket connection, a shaft coupling member pivotally connected to each shaft end having flat torque transmitting portions thereof slidably engaged with mating, flat torque transmitting portions on the coupling member mounted on the other shaft, said coupling members being pivotally mounted on said shafts on pivot axes extending transversely of the shafts so as to be free to oscillate about their pivotal connections during rotation of said shafts in angularly related positions, and a lubricant transfer conduit extending lengthwise of at least one of said shaft end portions having a discharge portion thereof connected to the aforesaid self-centering ball and socket connection and having an inlet portion located at a point that is spaced longitudinally from the discharge position and located radially outwardly from the associated coupling member pivot axis and adjacent a wall portion of the associated coupling member that is arranged to oscillate towards and away from the inlet portion during shaft rotation, the shaft rotation induced oscillation of the coupling members providing a forced feed pump, whenever said casing contains sufficient lubricant to provide a lubricant film over the joint exterior that covers the said conduit inlet portion, for squeezing the lubricant located between the said coupling wall portion and the entrance to said conduit inlet portion through the conduit towards the self-centering shaft end interconnection.

3. A universal joint comprising two shafts having intersecting axes and end portions directly connected by a self-centering, self-supporting, force transmitting, ball and socket connection adapted to transmit thrust loads directly between the intersecting shaft ends, a lubricant retaining casing enclosing said shaft end portions, a torque transmitting block member pivotally connected about the end portion of one of the shafts having a pivot axis perpendicular to and intersecting the associated shaft axis, said block member having a pair of flat faces extending parallel to the pivot axis of the block member, and a torque transmitting jaw member pivotally connected about the end portion of the other shaft having a pivot axis perpendicular to and intersecting the associated shaft axis, said jaw member having projecting jaw tongues extending axially therefrom formed with flat opposed inner faces parallel to the pivot axis of the jaw member and positioned to slidably engage the end faces of the block member in surface-to-surface contact, lubricant transfer conduits extending lengthwise of and piercing each shaft end portion enclosed by said block and jaw members, said conduits each connecting an outside face of one of said block and jaw enclosed shaft end portions that is radially spaced from the pivot axis associated therewith, with the said ball and socket end connection, said conduits each having an entrance adjacent a relatively movable interiorly disposed portion of one of said block and jaw members such that rotation of said shafts in angularly related positions causes interiorly disposed portions of said block and jaw members to move toward and away from the adjacent conduit entrance and function as pump means, whenever said casing contains sufficient lubricant to provide a lubricant film over the joint exterior that covers the lubricant conduit entrances, to force the lubricant adjacent the conduit entrances to pass through said bores to the slidably engaged portions of said ball and socket connection.

4. A universal joint comprising two shafts having intersecting axes and end portions directly connected by a self-centering, self-supporting, force transmitting, ball and socket connection adapted to transmit thrust loads directly between the intersecting shaft ends, a lubricant retaining casing enclosing said shaft end portions, a torque transmitting block member pivotally connected about the end portion of one of the shafts having a pivot axis perpendicular to and intersecting the associated shaft axis, said block member having a pair of flat faces extending parallel to the pivot axis of the block member, and a torque transmitting jaw member pivotally connected about the end portion of the other shaft having a pivot axis perpendicular to and intersecting the associated shaft axis, said jaw member having projecting jaw tongues extending axially therefrom formed with flat opposed inner faces parallel to the pivot axis of the jaw member and positioned to slidably engage the end faces of the block member in surface-to-surface contact, lubricant transfer conduits extending lengthwise of and piercing each shaft end portion enclosed by said block and jaw members, said conduits each connecting an outside face of one of said block and jaw enclosed shaft end portions, that is radially spaced from the pivot axis associated therewith, with the said ball and socket end connection, said conduits each having an entrance adjacent a relatively movable interiorly disposed portion of one of said block and jaw members such that rotation of said shafts in angularly related positions causes interiorly disposed portions of said block and jaw members to move toward and away from the adjacent conduit entrance and to function as pump means, whenever said casing contains sufficient lubricant to provide a lubricant film over the joint exterior that covers the lubricant conduit entrances, to force the lubricant adjacent the conduit entrances to pass through said bores to the slidably engaged portions of said ball and socket connection and other conduits connected with said aforementioned lubricant transfer conduits and with the pivotal connections for said block and jaw members on the respective shaft end portions adapted to provide means for passing a supply of lubricant to the said pivotal connections on the movement of said block and jaw members during shaft rotation.

References Cited in the file of this patent

UNITED STATES PATENTS

| | | |
|---|---|---|
| 1,184,915 | Bartlett | May 30, 1916 |
| 1,304,270 | Dawson et al. | May 20, 1919 |
| 1,898,265 | Ragan | Feb. 21, 1933 |
| 2,067,286 | Pearce | Jan. 12, 1937 |
| 2,426,358 | Klages et al. | Aug. 26, 1947 |
| 2,473,036 | Miller, Jr. | June 14, 1949 |
| 2,525,695 | Lombard | Oct. 10, 1950 |
| 2,609,673 | Butterfield | Sept. 9, 1952 |
| 2,617,279 | Miller, Jr. | Nov. 11, 1952 |